(12) United States Patent
Zou et al.

(10) Patent No.: US 9,903,410 B2
(45) Date of Patent: Feb. 27, 2018

(54) THRUST LEVER BALL HEAD ASSEMBLY, AN APPARATUS AND A METHOD FOR ITS ASSEMBLING

(71) Applicant: ZHUZHOU TIMES NEW MATERIAL TECHNOLOGY CO., LTD, Zhuzhou (CN)

(72) Inventors: Bo Zou, Zhuzhou (CN); Duankang Xie, Zhuzhou (CN); Yong Xia, Zhuzhou (CN); Yabin Zhao, Zhuzhou (CN); Jianlin Liu, Zhuzhou (CN); Chengjun Luo, Zhuzhou (CN); Chunjie Guo, Zhuzhou (CN); Haitao Cheng, Zhuzhou (CN)

(73) Assignee: ZHUZHOU TIMES NEW MATERIAL TECHNOLOGY CO., LTD, Zhuzhou (CN)

( * ) Notice: Subject to any disclaimer, the term of this patent is extended or adjusted under 35 U.S.C. 154(b) by 0 days.

(21) Appl. No.: 15/118,404

(22) PCT Filed: Dec. 1, 2014

(86) PCT No.: PCT/CN2014/092648
§ 371 (c)(1),
(2) Date: Aug. 11, 2016

(87) PCT Pub. No.: WO2015/120733
PCT Pub. Date: Aug. 20, 2015

(65) Prior Publication Data
US 2017/0175805 A1 Jun. 22, 2017

(30) Foreign Application Priority Data
Feb. 11, 2014 (CN) .......................... 2014 1 0047540

(51) Int. Cl.
*F16C 11/08* (2006.01)
*F16C 11/06* (2006.01)
(Continued)

(52) U.S. Cl.
CPC .......... *F16C 11/083* (2013.01); *B23P 19/027* (2013.01); *B60G 7/005* (2013.01);
(Continued)

(58) Field of Classification Search
CPC ..... F16C 11/0614; F16C 11/08; F16C 11/083; F16C 11/086; F16C 2226/74;
(Continued)

(56) References Cited

U.S. PATENT DOCUMENTS

| 4,158,511 A | * | 6/1979 | Herbenar | ................ F16C 11/08 384/297 |
| 5,595,452 A | * | 1/1997 | Hill | ........................... F16C 7/02 403/221 |

(Continued)

FOREIGN PATENT DOCUMENTS

| CA | 2517701 A1 | 4/2000 |
| CN | 100596286 C | 3/2010 |

(Continued)

OTHER PUBLICATIONS

The World Intellectual Property Organization (WIPO) International Search Report for PCT/CN2014/092648 Mar. 2, 2015, pp. 1-6.

*Primary Examiner* — Phillip A Johnson
(74) *Attorney, Agent, or Firm* — Anova Law Group, PLLC

(57) ABSTRACT

The current invention discloses a thrust lever ball head assembly comprising a thrust lever ball hinge and a thrust lever ball head. The thrust lever ball head comprises a main body of the thrust lever ball head and flange structures on both sides of the main body of the thrust lever ball head, wherein the flange structures and the main body of the thrust lever ball head are an integral part, and the flange structures on both sides of the main body of the thrust lever ball head work together with the thrust lever ball hinge to limit the thrust lever ball hinge inside the thrust lever ball head. The thrust lever ball head assembly of the present invention has a simple structure, high assembling efficiency, low manufacture costs, light weight, free of maintenance and completely fulfills the requirements of light weight.

9 Claims, 6 Drawing Sheets

(51) Int. Cl.
 *B23P 19/027* (2006.01)
 *B60G 7/00* (2006.01)
(52) U.S. Cl.
 CPC ....... *F16C 11/0614* (2013.01); *B23P 2700/11* (2013.01); *B23P 2700/14* (2013.01); *B60G 2204/416* (2013.01); *B60G 2206/011* (2013.01); *F16C 2226/74* (2013.01); *F16C 2326/05* (2013.01)
(58) Field of Classification Search
 CPC .............. F16C 2326/05; B23P 2700/11; B23P 2700/14; B60G 7/005; B60G 2204/416; B60G 2206/011
 See application file for complete search history.

(56) References Cited

U.S. PATENT DOCUMENTS 7,306,211 B2 * 12/2007 Bjorkgard .............. B60G 7/005
 267/141
2005/0179182 A1 * 8/2005 Wolter .................. F16F 1/3842
 267/141.7

FOREIGN PATENT DOCUMENTS

| CN | 203202004 U | 9/2013 | |
|---|---|---|---|
| CN | 103350626 A | 10/2013 | |
| CN | 103758854 A | 4/2014 | |
| JP | 06323354 A | * 11/1994 | .......... F16C 11/0614 |

\* cited by examiner

THRUST LEVER BALL HEAD ASSEMBLY, AN APPARATUS AND A METHOD FOR ITS ASSEMBLING

CROSS REFERENCE TO RELATED APPLICATION

This application is a US national stage of PCT Patent Application No. PCT/CN2014/092648, filed on Dec. 1, 2014, which claims priority of Chinese Patent Application No. 2014100475405, filed on Feb. 11, 2014, the entire content of all of which is incorporated herein by reference.

TECHNICAL FIELD

The current invention is related to a component structure of a vehicle and a method for its production, especially a thrust lever ball head assembly of a vehicle suspension balance, an apparatus and a method for its assembling, mainly for the manufacture of a vehicle thrust lever ball head assembly. It belongs to the technical field of vehicles.

BACKGROUND

A thrust lever is widely applied in the single axis of a dependent suspension of heavy trucks or passenger carriages or in dual rear axle of heavy vehicles, wherein it connects the vehicle frame with the vehicle axle. Its functions are: to ensure the relative positions of the vehicle frame and the vehicle axle, to transmit all kinds of forces and torques brought by the vehicle frame and the vehicle axle, to ensure the motion profile of the vehicle axle, etc. Therefore, a thrust lever influences directly the operation stability, smoothness as well as the comfort of passengers of a vehicle.

Nowadays, a thrust lever ball hinge works together with a thrust lever ball head in the following ways:
1. The ball hinge cooperates with the ball head via interference fit in order to satisfy the functions of the thrust lever.
2. The ball hinge is limited inside the ball head via an internal circlip or a shaft clamp ring to satisfy the functions of the thrust lever.

In the first way, there exist two different cooperation ways: for the interference fit for the metal coat, the magnitude of interference should be reasonably designed. Otherwise, the ball hinge coat or the ball head cavity can be damaged. In addition, the coat needs to be thick enough in order to ensure enough interference fit. Otherwise, axle displacement might occur. This increases costs and disobeys the light weight concept. Regarding interference fit for elastic bodies, it needs not only suitable contours and magnitude of interference, but also good anti-abrasion property and resilience of the elastic body. In addition, the adhesive strength between the metal core shaft and the inner shaft needs to be strong enough in order to satisfy the functions of the thrust lever. Otherwise, the press-fit rubber might detach from the metal, press-fit is asymmetric, and the press-fit efficiency is low. During the long-term use, since the rubber bears different static-dynamic load, the rubber can creep and its ability to bear load decreases. Axle displacement can occur.

In the second way, the requirements for the size, the material, the degree of roughness of the surface and the surface treatment are high. The cooperation size among the ball hinge, the ball head and the ring needs to be rationally designed in order to prevent the ring from falling off which disables the thrust lever. The self-lock structure of the ring usually has a complicated structure, which is complicated to assemble. The press-fit can easily be out of place which renders it invalid.

It can be seen that the above two traditional assembling methods of a thrust lever ball head assembly have the following drawbacks: complicated structure, low assembling efficiency, high costs, heavy weight, difficult maintenance, difficult to test qualification, etc.

SUMMARY

The technical problem of the present invention is to overcome the drawbacks of the techniques in the state of the art, and to provide a thrust lever ball head assembly, which has a simple structure, high assembling efficiency, low manufacture costs, light weight, free of maintenance and completely fulfills the requirements of light weight.

In order to solve the above technical problem, the current invention provides a technical solution as follows: a thrust lever ball head assembly comprising a thrust lever ball hinge and a thrust lever ball head. The thrust lever ball head comprises a main body of the thrust lever ball head and flange structures on both sides of the main body of the thrust lever ball head, wherein the flange structures and the main body of the thrust lever ball head are an integral part, and the flange structures on both sides of the main body of the thrust lever ball head work together with the thrust lever ball hinge to limit the thrust lever ball hinge inside the thrust lever ball head.

Preferably, said thrust lever ball hinge is a radially pre-compression styled elastic ball hinge of an integral rubber body, or a radially pre-compression styled elastic ball hinge of an integral metal coat, or an axially pre-compression styled elastic ball hinge of the metal lids on both sides, and said flange structures of the thrust lever ball head comprises arc flange parts located on both sides of the main body of the thrust lever ball head as well as linear flange parts located on the arc flange parts. The arc flange parts and the linear flange parts on both sides of the thrust lever ball head are snap fitted onto the rubber body of the radially pre-compression styled elastic ball hinge of the integral rubber body, or onto the metal coat of the radially pre-compression styled elastic ball hinge of the integral metal coat, or onto the metal lids of the axially pre-compression styled elastic ball hinge of the metal lids on both sides, in order to limit the thrust lever ball hinge inside the thrust lever ball head.

The current invention also provides an apparatus for assembling the thrust lever ball head assembly, comprising a double-acting oil press. It further comprises a bottom die, comprising a main body of the bottom die, a first central hole, an insert cavity and a first guide block groove, wherein the first central hole is located in the main body of the bottom die, the insert cavity is located in the main body of the bottom die and is connected with the first central hole and is for placing an insert, and the first guide block groove is located in the main body of the bottom die and beside the insert cavity;

a middle die, comprising a main body of the middle die, a second central hole, a notch and a guide block cavity, wherein the second central hole is located in the main body of the middle die, the notch is connected with the second central hole and is to avoid the sleeve, and the guide block cavity is located in the main body of the middle die and its position corresponds to the position of the first guide block groove in the bottom die;

an upper die, comprising a main body of the upper die, a third central hole, an upper flange limiting groove and a second guide block groove, wherein the third central hole is located in the main body of the upper die, the upper flange limiting groove is located in the main body of the upper die and on the peripheral of said third central hole and the structure of the upper flange limiting groove matches with the flange structure when the thrust lever ball head snap fits onto the thrust lever ball hinge, and the second guide block groove is located in the main body of the upper die and its position corresponds with the position of the guide block cavity of the middle die;

positioning insert, comprising a main body of the positioning insert, a fourth central hole and a positioning groove, wherein the fourth central hole is located in the main body of the positioning insert, and the positioning groove is located in the main body of the positioning insert and is on the peripheral of the fourth central hole;

flange insert, comprising a main body of the flange insert, a fifth central hole and a lower flange limiting groove, wherein the fifth central hole is located in the main body of the flange insert, the lower flange limiting groove is located in the main body of the flange insert and on the peripheral of said fifth central hole and the structure of the lower flange limiting groove matches with the flange structure when the thrust lever ball head snap fits onto the thrust lever ball hinge; and a guide block, wherein one side of the guide block can insert into the first guide block groove in the bottom die, and the middle part of the guide block passes through the guide block cavity in the middle die, and the other side of the guide block can insert into the second guide block groove in the upper die.

Preferably, the peripheral of the insert cavity in the bottom die, the peripheral of the positioning groove of the positioning insert and the peripheral of the flange limiting groove of the flange insert are all provided with angle indexes.

The current invention also provides a method for assembling the thrust lever ball head assembly comprising the following steps:

(1) connecting the thrust lever ball head which has flange structures on two sides with a sleeve to form a lever body;

(2) determining the pressure parameters for the double-acting oil press according to the process requirements, adjusting the positions of the two press heads of the double-acting oil press according the length requirement of the product, positioning the bottom die right below the corresponding press head, and placing the positioning insert into the insert cavity of the bottom die;

(3) placing the lever body on the bottom die, and inserting the flange structures on both sides of the thrust lever ball head into the positioning groove of the positioning insert;

(4) after positioning, controlling the press head and press the thrust lever ball hinge into the thrust lever ball head;

(5) after pressing, retrieving the press head, and lifting the lever body after it has been pressed into the thrust lever ball hinge, and replacing the positioning insert of the bottom die with the flange insert;

(6) inserting one side of said guide block into the lower guide block groove of the bottom die, passing the middle die through the guide block and placing it on said bottom die through cooperation between the guide block cavity of the middle die with said guide block, releasing the lever body which has been pressed into the ball hinge, so that the side of the thrust lever ball head presses against the inner side of the middle die and the flange structure at the bottom of the thrust lever ball head is positioned inside the lower flange limiting groove of the flange insert, placing the upper die above the thrust lever ball head, at this time, the other side of the guide block groove inserts into the upper guide block groove of the upper die and the flange structure of the thrust lever ball head is positioned inside the upper flange limiting groove of the upper die;

(7) pressing down the press heads to bring the upper die close to the bottom die, the upper flange limiting groove of the upper die and the bottom flange limiting groove of the flange insert press the flange structures on both sides of the thrust lever ball head together, so that the thrust lever ball head final snap fits onto the thrust lever ball hinge, after the upper and bottom dies close, maintaining the pressure, after the pressure is maintained, retrieving the press heads, and removing the product to complete the assembling process.

Preferably, the time for pressure maintaining procedure in step (7) is between 3 s to 5 s.

The advantages of the current invention lie in: in the current invention, the flange structures, which are located on both sides of the thrust lever ball head and which form an integral part with the thrust lever ball head, snap fit onto the thrust lever ball head hinge, in order to limit the thrust lever ball hinge into the thrust lever ball head. The thrust lever ball head assembly of the present invention has a simple structure, high assembling efficiency, low manufacture costs, light weight, free of maintenance and completely fulfills the requirements of light weight. Using assembling apparatus and the method for assembling, the operation is simple, the assembling time is reduced and the assembling efficiency is increased.

In the figures: 1 thrust lever ball hinge, 2 main body of the thrust lever ball head, 3 flange structure, 31 arc flange parts, 32 linear flange parts, 4 rubber body, 5 press head, 6 bottom die, 61 main body of the bottom die, 62 first central hole, 63 insert cavity, 64 first guide block groove, 7 middle die, 71 the main body of the middle die, 72 second central hole, 73 notch, 74 guide block cavity, 8 upper die, 81 main body of the upper die, 82 third central hole, 83 upper flange limiting groove, 84 second guide block groove, 9 positioning insert, 91 main body of the positioning insert, 92 fourth central hole, 93 limiting groove, 10 flange insert, 101 main body of the flange insert, 102 fifth central hole, 103 lower flange limiting groove, 11 guide block, 12 angle index, 13 sleeve, 14 straight section of the dabber step, 15 metal coat, 16 metal lid.

DETAILED DESCRIPTION

The present invention is further illustrated with the following figures and embodiments.

Embodiment 1

Figure 1:
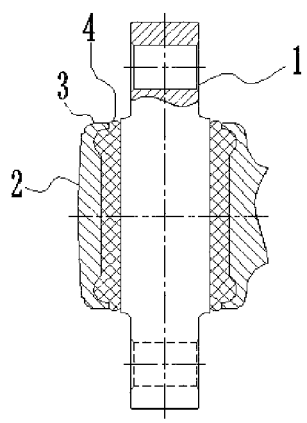
FIG. 1 shows the structure of the thrust lever ball head assembly in embodiment 1 of the present invention.
Figure 2:
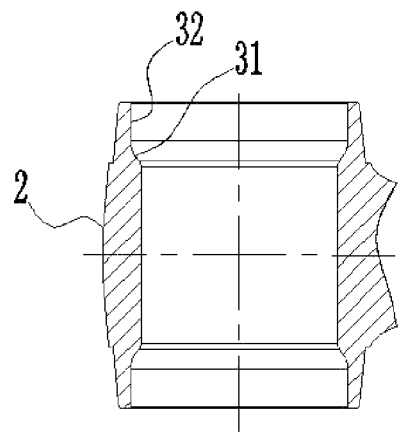
FIG. 2 shows the structure of the thrust lever ball head of the thrust lever ball head assembly in the embodiment 1 before it is assembled.

As shown in FIGS. 1 and 2, a thrust lever ball head assembly comprising a thrust lever ball hinge 1 and a thrust lever ball head. The thrust lever ball head comprises a main body 2 of the thrust lever ball head and flange structures 3 on both sides of the main body 2 of the thrust lever ball head, wherein the flange structures 3 and the main body 2 of the thrust lever ball head are an integral part, and the flange structures 3 on both sides of the main body 2 of the thrust lever ball head work together with the thrust lever ball hinge 1 to limit the thrust lever ball hinge 1 inside the thrust lever ball head.

The thrust lever ball hinge 1 is a radially pre-compression styled elastic ball hinge of an integral rubber body, and said flange structures 3 of the thrust lever ball head comprises arc flange parts 31 located on both sides of the main body 2 of the thrust lever ball head as well as linear flange parts 32 located on the arc flange parts 31. The arc flange parts 31 and the linear flange parts 32 on both sides of the thrust lever ball head are snap fitted onto the rubber body 4 of the radially pre-compression styled elastic ball hinge of the integral rubber body, in order to limit the thrust lever ball hinge 1 inside the thrust lever ball head.

In FIG. 2, the thrust lever ball head assembly has not been assembled. The thrust lever ball head has not been snap fitted onto the thrust lever ball hinge. The linear flange part 32 of the flange structure is located at the tangential direction of the connection point between the linear flange part 32 and the arc flange part 31. In FIG. 1, the thrust lever ball head assembly has been assembled, and the thrust lever ball head has been snap fitted onto the thrust lever ball hinge. At this time, the linear flange part 32 of the flange structure is no longer located at the tangential direction of the connection point between the linear flange part 32 and the arc flange part 31, but rather toward the inward direction of the arc flange part 32. That is to say, it deflects towards the circle center of the arc flange part 32 to certain degrees. Finally, the linear flange part 32 snap fits onto the rubber body 4 of the thrust lever ball hinge in order to limit the position of the thrust lever ball hinge.

The outer surface of the radially pre-compression styled elastic ball hinge of an integral rubber body is a pure elastic body. During the assembling, when the linear flange part 32 receives pressure, it compresses the elastic body and make the elastic body deform. Since the elastic body cannot be compressed, the deformed elastic body can be pressed into the cavity formed by the arc flange part 31, and fills the whole cavity in the end. Finally, the linear flange part 32, arc flange part 31 work together with the deformed elastic body to make the thrust lever ball head tightly snap fit onto the elastic body of the thrust lever ball hinge, namely the thrust lever ball hinge is limited inside the thrust lever ball head so that it will not fall and the functions of the thrust lever can be fulfilled. At this time, the inside of the thrust lever ball head forms an integral sealed structure. The main function of the cavity formed by the arc flange part 31 is to accommodate the deformed rubber elastic body pressed by the linear flange part 32, in order to reduce the elastic deformation of the rubber elastic body, so that the residual stress inside the elastic body due to the press can be reduced to some degree. As a result, the elastic body can only receive pressure and the bouncing force is reduced. It is avoided that the linear flange part 32 of the thrust lever ball head props open due to the bouncing force of the elastic body during use.

Figure 5:
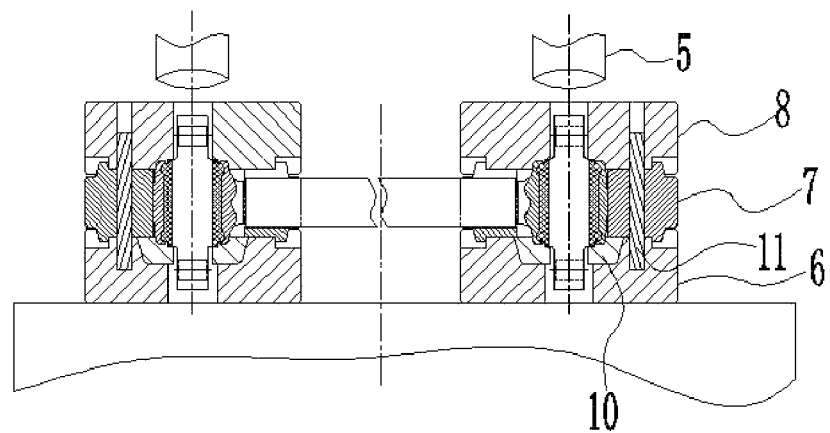
FIG. 5 shows the assemble sketch map two of the thrust lever ball head assembly in embodiment 1 of the present invention.

As shown in FIG. 3 to 8, the current invention also provides an apparatus for assembling the thrust lever ball head assembly, comprising a double-acting oil press 5. It further comprises a bottom die 6, comprising a main body 61 of the bottom die, a first central hole 62, an insert cavity 63 and a first guide block groove 64, wherein the first central hole 62 is located in the main body 61 of the bottom die, the insert cavity 63 is located in the main body 61 of the bottom die and is connected with the first central hole 62 and is for placing an insert, and the first guide block groove 64 is located in the main body 61 of the bottom die and beside the insert cavity 63;

a middle die 7, as shown in FIGS. 5, 6, 13 and 14, comprising a main body of the middle die 71, a second central hole 72, a notch 73 and a guide block cavity 74, wherein the second central hole 72 is located in the main body of the middle die 71, the notch 73 is connected with the second central hole 72 and is to avoid the sleeve, and the guide block cavity 74 is located in the main body of the middle die 71 and its position corresponds to the position of the first guide block groove 64 in the bottom die;

an upper die 8, as shown in FIGS. 5, 6, 15 and 16, comprising a main body of the upper die 81, a third central hole 82, an upper flange limiting groove 83 and a second guide block groove 84, wherein the third central hole 82 is located in the main body of the upper die 84, the upper flange limiting groove 83 is located in the main body 81 of the upper die and on the peripheral of said third central hole 82 and the structure of the upper flange limiting groove 83 matches with the flange structure when the thrust lever ball head snap fits onto the thrust lever ball hinge, and the second guide block groove 84 is located in the main body of the upper die 81 and its position corresponds with the position of the guide block cavity 74 of the middle die;

positioning insert 9, as shown in FIGS. 3, 4, 9, and 10, comprising a main body of the positioning insert 91, a fourth central hole 92 and a positioning groove 93, wherein the fourth central hole 92 is located in the main body of the positioning insert 91, and the positioning groove 93 is located in the main body of the positioning insert 91 and is on the peripheral of the fourth central hole 92;

flange insert 10, as shown in FIGS. 5, 6, 11, and 12, comprising a main body of the flange insert 101, a fifth central hole 102 and a lower flange limiting groove 103, wherein the fifth central hole 102 is located in the main body of the flange insert 101, the lower flange limiting groove 103 is located in the main body of the flange insert and on the peripheral of said fifth central hole 102 and the structure of the lower flange limiting groove 103 matches with the flange structure when the thrust lever ball head snap fits onto the thrust lever ball hinge; and a guide block 11, as shown in FIGS. 5 and 5, wherein one side of the guide block 11 can insert into the first guide block groove 64 in the bottom die, and the middle part of the guide block passes through the guide block cavity 74 in the middle die, and the other side of the guide block can insert into the second guide block groove 84 in the upper die.

Said upper die 8, middle die 7 and bottom die 6 are all designed to be cylinders. Said flange insert 10 and said positioning insert 9 are both designed to be a frustum of a cone.

Figure 3:
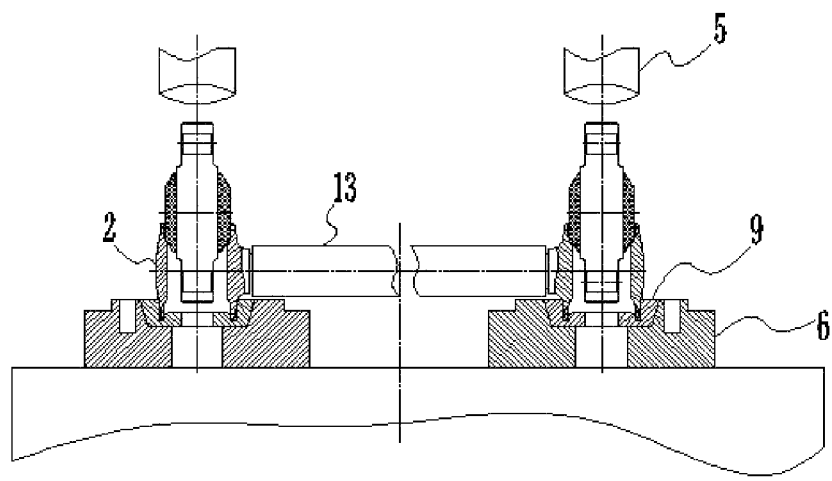
FIG. 3 shows the assemble sketch map one of the thrust lever ball head assembly in embodiment 1 of the present invention.
Figure 4:
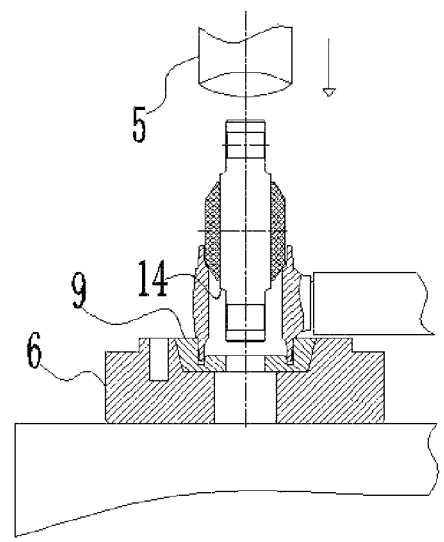
FIG. 4 is a partial enlargement of FIG. 3.
Figure 6:
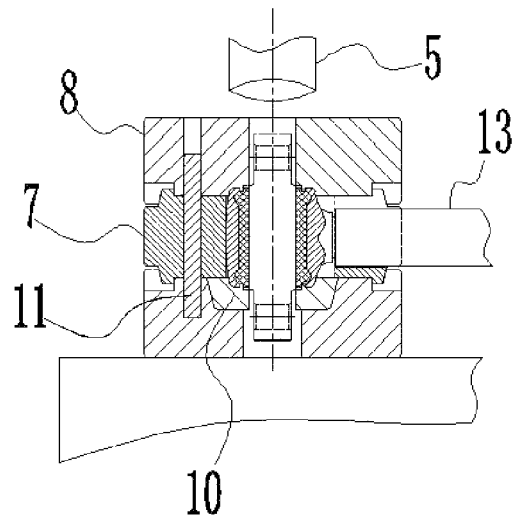
FIG. 6 is a partial enlargement of FIG. 5.

As shown in FIGS. 3 and 4, the flange structures of the thrust lever ball head when it is not snap fitted onto the thrust lever ball hinge fit into said positioning groove 93 in order to realize the positioning of the thrust lever ball head. As shown in FIGS. 5 and 6, the upper flange limiting groove 83 of the upper die and the lower flange limiting groove 103 of the flange insert press the two flange structures on both sides of the thrust lever head simultaneously, so that the thrust lever ball head finally snap fits onto the thrust lever ball hinge. The lower flange limiting groove 103 and the upper flange limiting groove 83 ensure that the linear flange part of the flange structure deflects towards the inward direction of the arc flange part 32 to certain degrees as well as the degree of symmetry and perpendicularity after flanging. The cooperation between the guide block and the middle, upper and bottom dies ensure the relative position of the dabber of the thrust lever ball hinge so that displacement does not occur after flanging. The functions of central holes 1 to 5 are to avoid thrust lever ball head and thrust lever ball hinge during the assembling of the thrust lever ball head assembly. Said positioning insert or flange insert matches with the insert cavity 63 of the bottom die. When the positioning insert or the flange insert is placed into the insert cavity 63, the positioning insert or the flange insert does not move.

Figure 7:
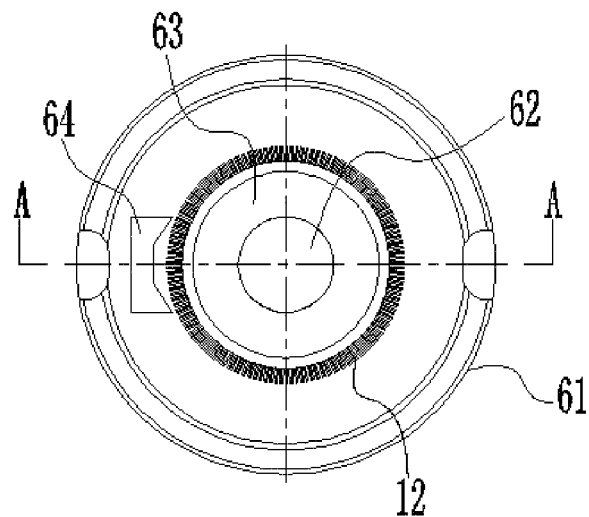
FIG. 7 is a top structure view of the bottom die of the assembling apparatus of the present invention.
Figure 8:
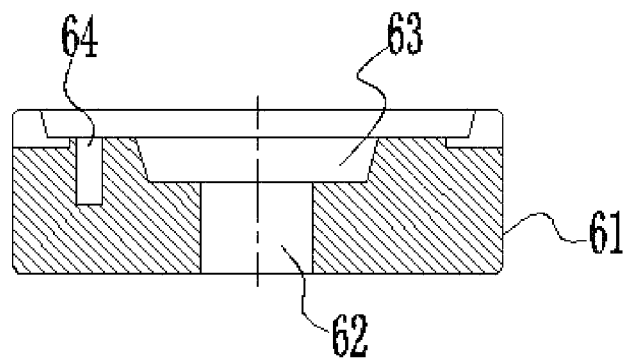
FIG. 8 is a section view along A-A line in FIG. 7.
Figure 9:
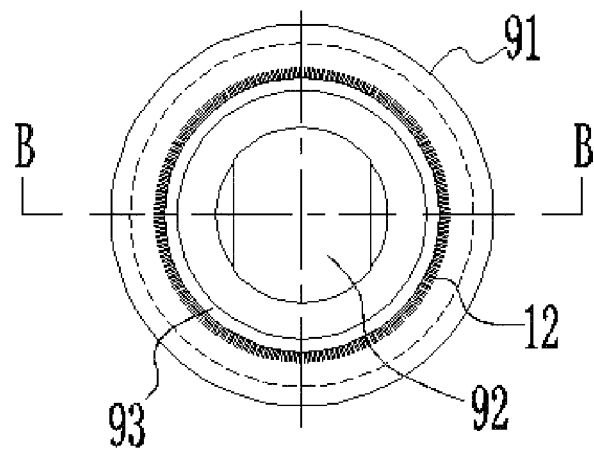
FIG. 9 is a top structure view of the positioning insert of the apparatus in embodiment 1 of the present invention.
Figure 10:
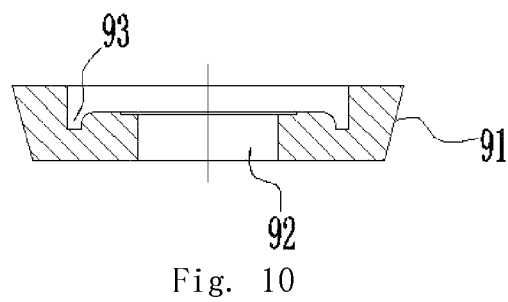
FIG. 10 is a section view along B-B line in FIG. 9.
Figure 11:
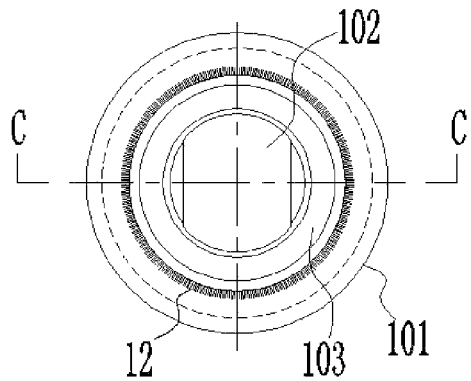
FIG. 11 is a top structure view of the flange insert of the apparatus in embodiment 1 of the present invention.
Figure 12:
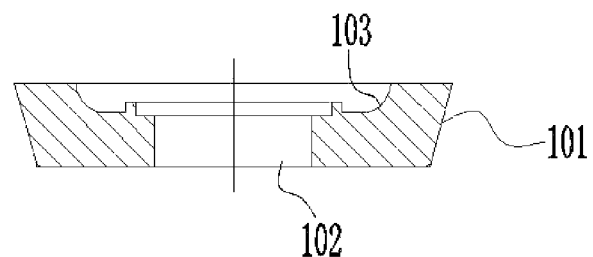
FIG. 12 is a section view along C-C line in FIG. 11.
Figure 13:
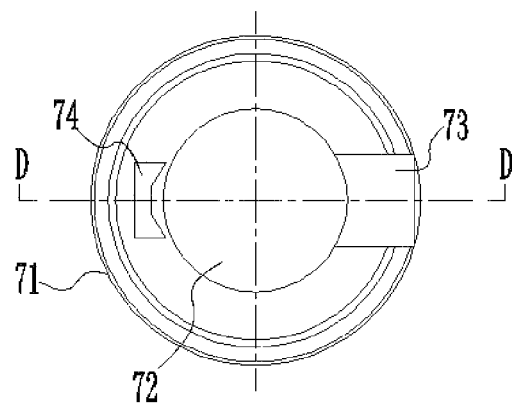
FIG. 13 is the top structure view of the middle die of the apparatus in embodiment 1 of the present invention.
Figure 14:
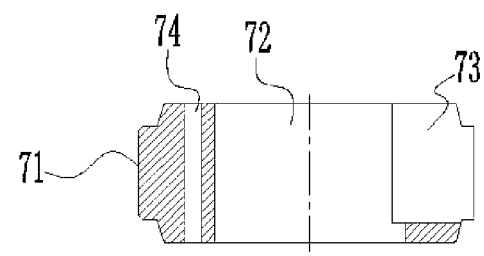
FIG. 14 is a section view along D-D line in FIG. 13.
Figure 15:
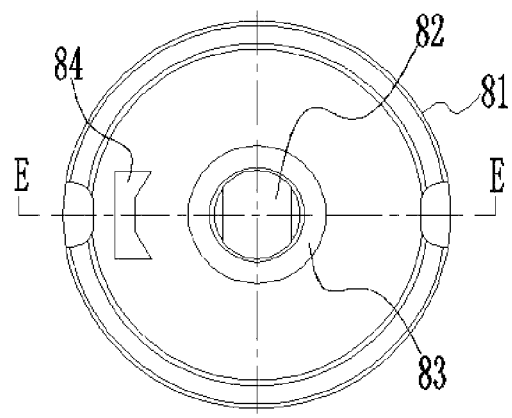
FIG. 15 is a bottom view of the upper die of the apparatus in embodiment 1 of the present invention.
Figure 16:
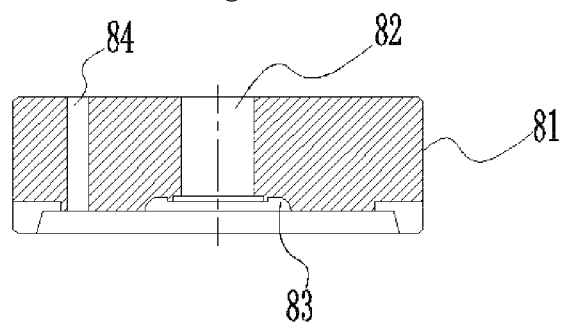
FIG. 16 is a section view along E-D line in FIG. 15.

As shown in FIGS. 7, 9 and 11, the peripheral of the insert cavity 63 in the bottom die, the peripheral of the positioning groove 93 of the positioning insert and the peripheral of the flange limiting groove 103 of the flange insert are all provided with angle indexes 12, the purpose of which is to adjust the angle of the press fitting ball hinge according to the requirements.

As shown in FIG. 3 to 6, the current invention also provides a method for assembling the thrust lever ball head assembly comprising the following steps:

(1) connecting the thrust lever ball head which has flange structures on two sides with a sleeve 13 to form a lever body;

(2) determining the pressure parameters for the double-acting oil press according to the process requirements, adjusting the positions of the two press heads 5 of the double-acting oil press according the length requirement of the product, positioning the bottom die 6 right below the corresponding press head 5, and placing the positioning insert 9 into the insert cavity 63 of the bottom die;

(3) placing the lever body on the bottom die 6, and inserting the flange structures 3 on both sides of the thrust lever ball head into the positioning groove of the positioning insert 9;

(4) after positioning, controlling the press head 5 and press the thrust lever ball hinge into the thrust lever ball head until the straight section 14 of the dabber step on the bottom of the thrust lever ball hinge contacts the positioning insert 9;

(5) after pressing, retrieving the press head 5, and lifting the lever body after it has been pressed into the thrust lever ball hinge, and replacing the positioning insert 9 of the bottom die 6 with the flange insert 10;

(6) inserting one side of said guide block 11 into the lower guide block groove of the bottom die 6, passing the middle die 7 through the guide block 11 and placing it on said bottom die 6 through cooperation between the guide block cavity of the middle die 7 with said guide block 11, releasing the lever body which has been pressed into the ball hinge, so that the side of the thrust lever ball head presses against the inner side of the middle die 7 and the flange structure at the bottom of the thrust lever ball head is positioned inside the lower flange limiting groove of the flange insert 10, placing the upper die above the thrust lever ball head, at this time, the other side of the guide block 11 groove inserts into the upper guide block groove of the upper die 8 and the flange structure of the thrust lever ball head is positioned inside the upper flange limiting groove of the upper die 8;

(7) pressing down the press heads 5 to bring the upper die close to the bottom die, the upper flange limiting groove of the upper die and the bottom flange limiting groove of the flange insert press the flange structures on both sides of the thrust lever ball head together, so that the thrust lever ball head final snap fits onto the thrust lever ball hinge, after the upper and bottom dies close, maintaining the pressure, after the pressure is maintained, retrieving the press heads, and removing the product to complete the assembling process.

In order to prevent bouncing force, the time for pressure maintaining procedure in step (7) is set to be 3 s, 4 s or 5 s.

Embodiment 2

Figure 17:
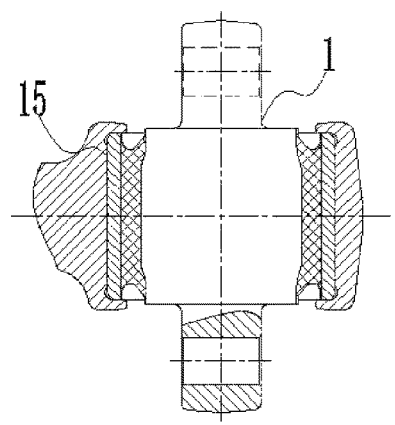
FIG. 17 shows the structure of the thrust lever ball head assembly in Embodiment 2 of the present invention.

As shown in FIG. 17, the difference from embodiment 1 lies in: said thrust lever ball hinge 1 is a radially pre-compression styled elastic ball hinge of an integral metal coat. The arc flange parts and the linear flange parts on both sides of the thrust lever ball head are snap fitted onto the metal coat of the radially pre-compression styled elastic ball hinge of the integral metal coat 15, in order to limit the thrust lever ball hinge 1 inside the thrust lever ball head.

Embodiment 3

Figure 18:
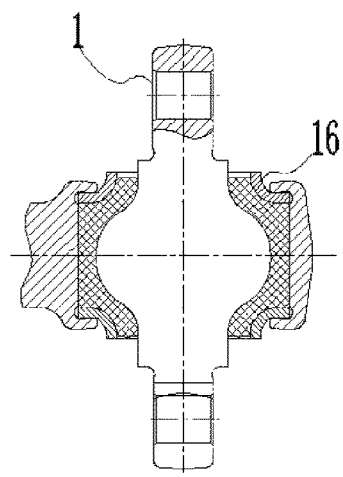
FIG. 18 shows the structure of the thrust lever ball head assembly in Embodiment 3 of the present invention.

As shown in FIG. 18, the difference from embodiment 1 lies in: said thrust lever ball hinge 1 is an axially pre-compression styled elastic ball hinge of the metal lids 16 on both sides. The arc flange parts and the linear flange parts on both sides of the thrust lever ball head are snap fitted onto the metal lids of the axially pre-compression styled elastic ball hinge of the metal lids 16 on both sides, in order to limit the thrust lever ball hinge inside the thrust lever ball head.

In the current invention, the flange structures, which are located on both sides of the thrust lever ball head and which form an integral part with the thrust lever ball head, snap fit onto the thrust lever ball head hinge, in order to limit the thrust lever ball hinge into the thrust lever ball head. The thrust lever ball head assembly of the present invention has a simple structure, high assembling efficiency, low manufacture costs, light weight, free of maintenance and completely fulfills the requirements of light weight. Using assembling apparatus and the method for assembling, the operation is simple, the assembling time is reduced and the assembling efficiency is increased.

The embodiments of the present invention only serve to illustrate the present invention rather than limit the scope of the invention. People skilled in the art can make amendments or changes to the invention without deviating from the spirit of the current invention. As a result, any equivalent technical solution also belongs to the scope of protection of the current invention. The scope of protection should be determined by the claims.

What is claimed is:

1. A thrust lever ball head assembly comprising a thrust lever ball hinge and a thrust lever ball head, wherein the thrust lever ball head comprises:
   a main body of the thrust lever ball head; and
   flange structures on both sides of the main body of the thrust lever ball head,
   wherein the flange structures have an inner diameter larger than an inner diameter of the main body before the thrust lever ball head is assembled;
   wherein the flange structures and the main body of the thrust lever ball head are an integral part, and the flange structures on both sides of the main body of the thrust lever ball head work together with the thrust lever ball hinge to limit the thrust lever ball hinge inside the thrust lever ball head;
   wherein said thrust lever ball hinge is a radially pre-compression styled elastic ball hinge with an integral rubber body, or a radially pre-compression styled elastic ball hinge with an integral metal coat, or an axially pre-compression styled elastic ball hinge with the metal lids on both sides, and
   said flange structures of the thrust lever ball head comprises arc flange parts located on both sides of the main body of the thrust lever ball head as well as linear flange parts located on the arc flange parts.

2. The thrust lever ball head assembly according to claim 1, wherein the arc flange parts and the linear flange parts on both sides of the thrust lever ball head are snap fitted onto the rubber body of the radially pre-compression styled elastic ball hinge with the integral rubber body.

3. The thrust lever ball head assembly according to claim 1, wherein the arc flange parts and the linear flange parts on both sides of the thrust lever ball head are snap fitted onto the metal coat of the radially pre-compression styled elastic ball hinge with the integral metal coat.

4. The thrust lever ball head assembly according to claim 1, wherein the arc flange parts and the linear flange parts on both sides of the thrust lever ball head are snap fitted onto the metal lids of the axially pre-compression styled elastic ball hinge with the metal lids on both sides, in order to limit the thrust lever ball hinge inside the thrust lever ball head.

5. An apparatus for assembling the thrust lever ball head assembly according to claim 1, including a double-acting oil press, the apparatus further comprising:
   a bottom die, comprising a main body of the bottom die, a first central hole, an insert cavity and a first guide block groove, wherein the first central hole is located in the main body of the bottom die, the insert cavity is located in the main body of the bottom die and is connected with the first central hole and is for placing an insert, and the first guide block groove is located in the main body of the bottom die and beside the insert cavity;
   a middle die, comprising a main body of the middle die, a second central hole, a notch and a guide block cavity, wherein the second central hole is located in the main body of the middle die, the notch is connected with the second central hole and is to avoid the sleeve, and the guide block cavity is located in the main body of the middle die and a position of the guide block cavity corresponds to a position of the first guide block groove in the bottom die;
   an upper die, comprising a main body of the upper die, a third central hole, an upper flange limiting groove and a second guide block groove, wherein the third central hole is located in the main body of the upper die, the upper flange limiting groove is located in the main body of the upper die and on the peripheral of said third central hole and the structure of the upper flange limiting groove matches with the flange structure when the thrust lever ball head snap fits onto the thrust lever ball hinge, and the second guide block groove is located in the main body of the upper die and a position of the second guide block groove corresponds with the position of the guide block cavity of the middle die;
   positioning insert, comprising a main body of the positioning insert, a fourth central hole and a positioning groove, wherein the fourth central hole is located in the main body of the positioning insert, and the positioning groove is located in the main body of the positioning insert and is on the peripheral of the fourth central hole;
   flange insert, comprising a main body of the flange insert, a fifth central hole and a lower flange limiting groove, wherein the fifth central hole is located in the main body of the flange insert, the lower flange limiting groove is located in the main body of the flange insert and on the peripheral of said fifth central hole and the structure of the lower flange limiting groove matches with the flange structure when the thrust lever ball head snap fits onto the thrust lever ball hinge; and
   a guide block, wherein one side of the guide block is capable of being inserted into the first guide block groove in the bottom die, and the middle part of the guide block passes through the guide block cavity in the middle die, and the other side of the guide block is capable of being inserted into the second guide block groove in the upper die.

6. The apparatus for assembling the thrust lever ball head assembly according to claim 5, wherein the peripheral of the insert cavity in the bottom die, the peripheral of the positioning groove of the positioning insert and the peripheral of the flange limiting groove of the flange insert are all provided with angle indexes.

7. A method for assembling a thrust lever ball head assembly, the thrust lever ball head assembly comprising a thrust lever ball hinge and a thrust lever ball head, the method comprising:
   (1) connecting the thrust lever ball head which has flange structures on both sides with a sleeve to form a lever body;
   (2) determining pressure parameters for a double-acting oil press according to process requirements, adjusting positions of two press heads of the double-acting oil press according a length requirement of product, positioning a bottom die right below a corresponding press head of the two press heads, and placing a positioning insert into an insert cavity of the bottom die;
   (3) placing a lever body on the bottom die, and inserting the flange structures on both sides of the thrust lever ball head into a positioning groove of the positioning insert;
   (4) after positioning, controlling the press head and press the thrust lever ball hinge into the thrust lever ball head;
   (5) after pressing, retrieving the press head, and lifting the lever body after the lever body has been pressed into the thrust lever ball hinge, and replacing the positioning insert of the bottom die with a flange insert;
   (6) inserting one side of a guide block into a lower guide block groove of the bottom die, passing a middle die through the guide block and placing it on said bottom die through cooperation between a guide block cavity of the middle die with said guide block, releasing the lever body which has been pressed into the ball hinge, so that the side of the thrust lever ball head presses against an inner side of the middle die and the flange structure at the bottom of the thrust lever ball head is positioned inside a lower flange limiting groove of the flange insert, placing an upper die above the thrust lever ball head, at this time, the other side of the guide block is inserted into an upper guide block groove of the upper die and the flange structure of the thrust lever ball head is positioned inside an upper flange limiting groove of the upper die;

(7) pressing down the press heads to bring the upper die close to the bottom die, the upper flange limiting groove of the upper die and the bottom flange limiting groove of the flange insert press the flange structures on both sides of the thrust lever ball head together, so that the thrust lever ball head final snap fits onto the thrust lever ball hinge, after the upper and bottom dies close, maintaining the pressure, after the pressure is maintained, retrieving the press heads, and removing the product to complete the assembling process.

8. The method for assembling according to claim 7, wherein a time for pressure maintaining procedure in step (7) is between 3 s to 5 s.

9. A thrust lever ball head assembly comprising a thrust lever ball hinge and a thrust lever ball head, wherein the thrust lever ball head comprises:

a main body of the thrust lever ball head; and flange structures on both sides of the main body of the thrust lever ball head, wherein the flange structures and the main body of the thrust lever ball head are an integral part, and the flange structures on both sides of the main body of the thrust lever ball head work together with the thrust lever ball hinge to limit the thrust lever ball hinge inside the thrust lever ball head;

wherein the thrust lever ball hinge is a radially pre-compression styled elastic ball hinge with an integral rubber body, or a radially pre-compression styled elastic ball hinge with an integral metal coat, or an axially pre-compression styled elastic ball hinge with the metal lids on both sides, and the flange structures of the thrust lever ball head comprises arc flange parts located on both sides of the main body of the thrust lever ball head as well as linear flange parts located on the arc flange parts; and wherein the arc flange parts and the linear flange parts on both sides of the thrust lever ball head are snap fitted onto the metal coat of the radially pre-compression styled elastic ball hinge with the integral metal coat.

* * * * *